United States Patent
Kumar et al.

(10) Patent No.: US 10,402,330 B2
(45) Date of Patent: Sep. 3, 2019

(54) ADAPTIVE COHERENCE FOR LATENCY-BANDWIDTH TRADEOFFS IN EMERGING MEMORY TECHNOLOGIES

(71) Applicant: Intel Corporation, Santa Clara, CA (US)

(72) Inventors: Karthik Kumar, Chandler, AZ (US); Mustafa Hajeer, Hillsboro, OR (US); Thomas Willhalm, Sandhausen (DE); Francesc Guim Bernat, Barcelona (ES); Benjamin Graniello, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/944,598

(22) Filed: Apr. 3, 2018

(65) Prior Publication Data
US 2019/0042429 A1    Feb. 7, 2019

(51) Int. Cl.
G06F 12/00 (2006.01)
*G06F 12/0831* (2016.01)
*G06F 12/0817* (2016.01)

(52) U.S. Cl.
CPC ...... *G06F 12/0831* (2013.01); *G06F 12/0817* (2013.01); *G06F 2212/621* (2013.01)

(58) Field of Classification Search
None
See application file for complete search history.

(56) References Cited

U.S. PATENT DOCUMENTS

| | | | |
|---|---|---|---|
| 2004/0002992 A1* | 1/2004 | Cypher | G06F 12/0815 |
| 2005/0216637 A1* | 9/2005 | Smith | G06F 12/0815 710/305 |
| 2013/0007376 A1* | 1/2013 | Kottapalli | G06F 12/0833 711/146 |

* cited by examiner

*Primary Examiner* — Jason W Blust
(74) *Attorney, Agent, or Firm* — Compass IP Law, PC

(57) ABSTRACT

Examples include a processor including a coherency mode indicating one of a directory-based cache coherence protocol and a snoop-based cache coherency protocol, and a caching agent to monitor a bandwidth of reading from and/or writing data to a memory coupled to the processor, to set the coherency mode to the snoop-based cache coherency protocol when the bandwidth exceeds a threshold, and to set the coherency mode to the directory-based cache coherency protocol when the bandwidth does not exceed the threshold.

21 Claims, 6 Drawing Sheets

ADAPTIVE COHERENCE FOR LATENCY-BANDWIDTH TRADEOFFS IN EMERGING MEMORY TECHNOLOGIES

TECHNICAL FIELD

Examples described herein are generally related to techniques used by a processor when accessing a memory.

BACKGROUND

Some computing systems including dynamic random-access memory (DRAM) for main memory currently use a directory-based cache coherence protocol—where the cache coherence state is stored in a distributed directory in main memory. In some implementations, error correcting code (ECC) bits on each cache line in memory are used to store the directory state of that cache line. This is done to improve memory latency in a multi-socket computing system—since a processor can consult the directory and avoid the need to snoop in some cases (which takes time and adds to the overall memory access latency). For example, the directory can indicate that no processor coupled to a remote socket has a copy of a given cache line in its cache. This eliminates the need to snoop for presence of that cache line in the caches coupled to the remote sockets. When a processor in a socket does access a cache line in memory, resulting in a copy of the cache line being cached, the directory needs to be appropriately updated in main memory. This is done by writing appropriate values to the ECC bits of that cache line in memory.

Directory protocols have been successful in reducing latency for DRAM. However, emerging memory technologies, such as persistent memories (e.g., non-volatile memories (NVMs)), have markedly different characteristics from DRAM: they have much higher latencies (approximately several times that of DRAM latency), and reads and writes have different bandwidths (read bandwidth is greater than write bandwidth). Both of the above negatively impacts the usage of directory-based coherence in different ways. The lower latency due to use of the directory can help with the latency challenges for persistent memory. Unfortunately, when there are several updates to be made to the directory, this can exacerbate the write bandwidth limitations, in particular, when the available bandwidth in the channel is limited. Thus, the write traffic to persistent memory due to directory traffic alone limits the read bandwidth available to an application.

An approach to this problem is to turn off the use of the directory. However, this results in a loss of the latency advantage due to avoiding snoops when using a directory, especially during phases when the bandwidth in the computing system is low. Further, one has to statically make a choice regarding directory usage at boot time. This involves making a hard boot-time tradeoff between latency and bandwidth and does not allow for a solution that considers both at the same time.

DETAILED DESCRIPTION

As contemplated in the present disclosure, embodiments of the present invention introduce a means for application software to get the latency advantages of directory-based coherence techniques combined with a sensitivity to when the additional write bandwidth due to directory coherence becomes a bottleneck on persistent memory systems. This involves a means to dynamically toggle the directory setting based on computing platform telemetry such as write bandwidth to persistent memory. Embodiments also encompass a means to ensure "correctness" when the directory is turned back on, since the directory bits would not have been updated when the directory was previously off and there will be a window of time when stale entries must not be erroneously used for coherence.

Figure 1:
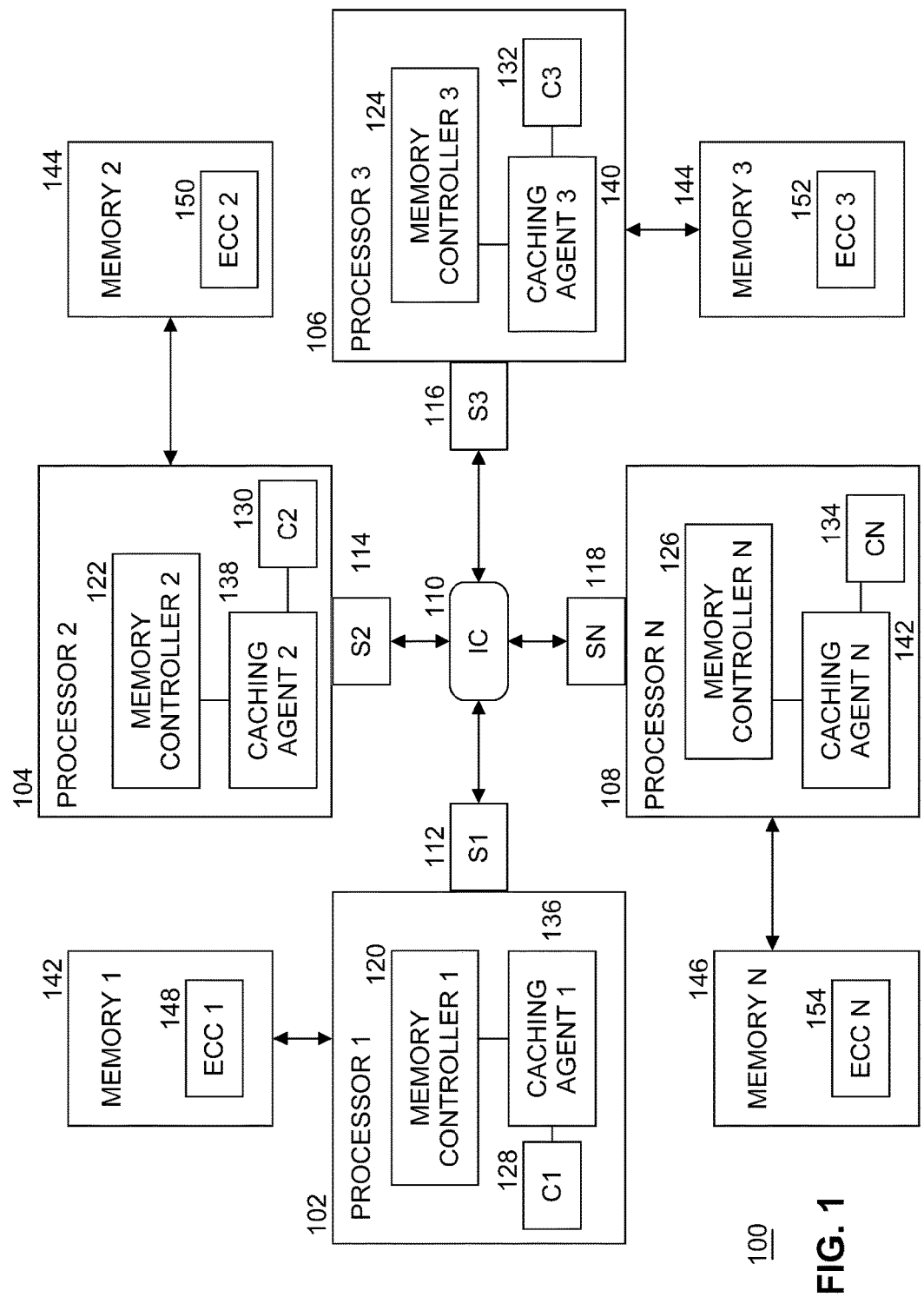
FIG. 1 illustrates an example first computing system.

FIG. 1 illustrates an example first computing system 100. Computing system 100 is representative of a data processing system having multiple sockets, processors and memories. As shown in FIG. 1, computing system 100 may include multiple sockets S1 112, S2 114, S3 116, and so on until SN 118, where N is a natural number. Sockets may comprise circuitry that couple processor 1 102, processor 2 104, processor 3 106, and so on until processor N 108. Sockets communicatively couple to each other circuitry called an interconnect (IC) 110. Each processor may be coupled to one or more main memories for storing data. In the example of FIG. 1, processor 1 102 may be coupled with memory 1 142, processor 2 104 may be coupled with memory 2 144, processor 3 may be coupled with memory 3 144, and so on until processor N 108 may be coupled with memory N 146. Although only one memory is shown as being coupled to a processor in FIG. 1, it is understood that there may be multiple memories coupled to each processor in some implementations. According to this example system configuration, when processor 1, for example, desires to access data in a memory that processor 1 is not directly coupled to, processor 1 must access that other memory via the socket of processor 1, the interconnect, the socket of the processor coupled to that other memory, and finally the other memory. In this way any processor may access data in any memory of computing system 100.

In embodiments, each processor may comprise a memory controller to interface to a memory, a cache memory, and caching agent logic. As shown in FIG. 1, processor 1 102 comprises memory controller 1 120, cache memory (C1) 128, and caching agent logic 1 136; processor 2 104 comprises memory controller 2 122, cache memory 2 (C2) 130, and caching agent logic 138; processor 3 106 comprises memory controller 3 124, cache memory 3 (C3) 132, and caching agent logic 3 140, and processor N 108 comprises memory controller N 126, cache memory N (CN) 134, and caching agent logic N 142. Cache memory may include one or more levels. Memory controller may include logic to interface with a main memory. In embodiments of the present invention, caching agent logic may include circuitry to manage the usage of a cache coherence protocol for computing system 100.

In embodiments of the present invention, computing system 100 of FIG. 1 includes non-volatile random-access memory (NVRAM) as one or more of memory 1 142, memory 2 144, memory 3 146, and memory N 148. NVRAM may be one or more of emerging non-volatile memory technologies such as Ferroelectric random-access memory (FeRAM), dielectric random-access memory, resistive random-access memory (ReRAM), Memristor random access memory, phase-change random access memory, three-dimensional cross-point random access memory (such as 3D XPoint™ commercially available from Intel Corporation), magnetic random-access memory (MRAM), and spin-torque transfer magnetic random-access memory (STT-MRAM). In one embodiment, NVRAM 101 is a three-dimensional cross-point RAM. In one embodiment, one or more of memory 1 142, memory 2 144, memory 3 146, and memory N 148 comprise three-dimensional cross-point random access memories.

Each of the memories may include ECC circuitry. As shown in FIG. 1, memory 1 142 includes ECC 1 150, memory 2 144 includes ECC 2 152, memory 3 146 includes ECC 3 154, and memory N 148 include ECC N 156. ECC circuitry may include logic to perform ECC corrections as needed and also to store information relating to a distributed directory for cache coherence.

Figure 2:
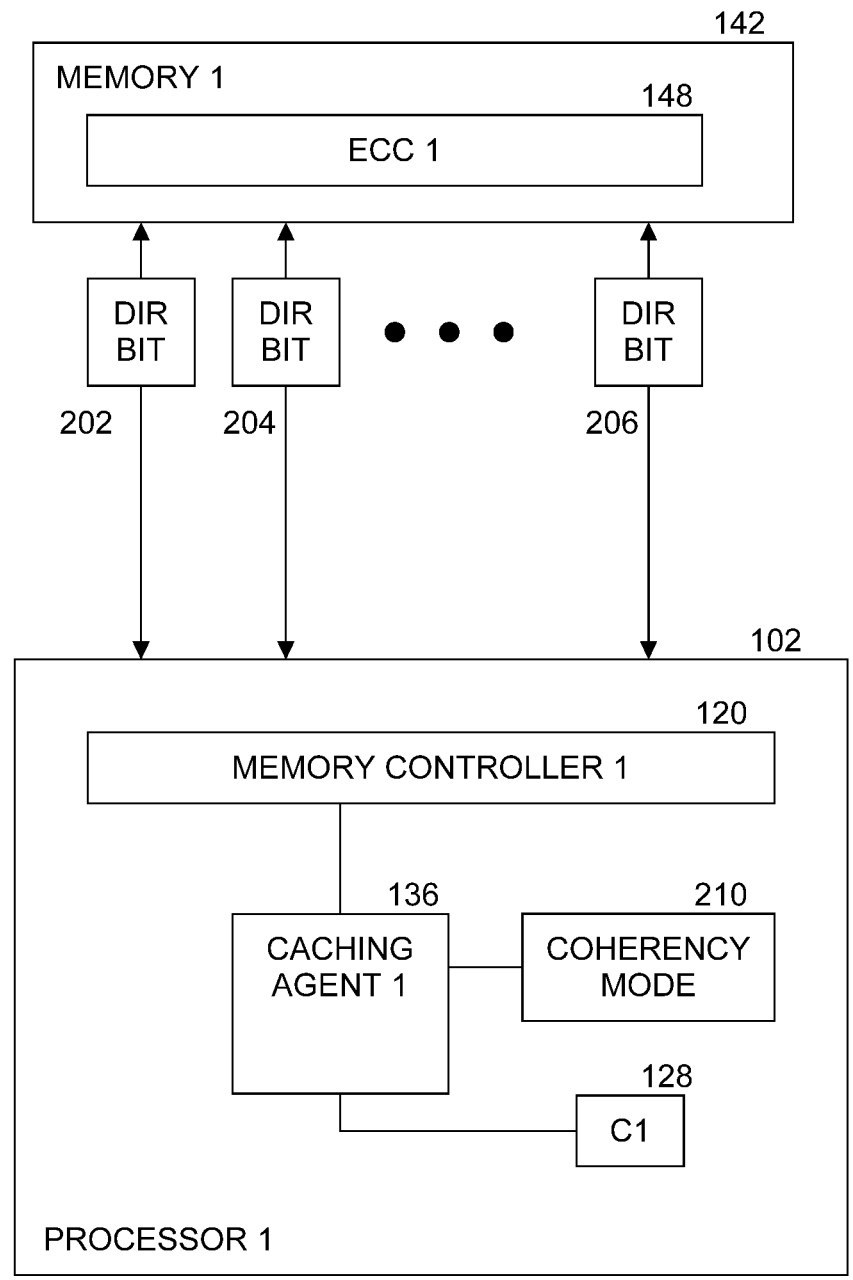
FIG. 2 illustrates an example second computing system.

FIG. 2 illustrates an example second computing system. FIG. 2 shows in further detail a relationship between a processor, such as processor 1 102, and a memory, such as memory 1 142, according to embodiments of the present invention. One or more cache lines may be used to couple processor 1 102 to memory 1 142. Each line in memory 1 142 may include one or more directory bits (Dir bit) 202, 204, . . . 206. In an embodiment, the directory bits may be part of the ECC bits of ECC 1 logic 148, and each directory bit may indicate a coherency status, such as clean or dirty, for a cache line. In embodiments of the present invention, the directory bits may be used to implemented directory-based cache coherence for the computing system. Directory bits may be used to avoid snoops entirely if the directory is clean (e.g., no other processor is caching the data associated with the cache lines). Caching agent 1 136 may read and/or write the directory bits to manage cache coherency for the computing system. Caching agent 136 also reads and/or write coherency mode 210 to indicate whether the coherency mode is directory or snoop. In an embodiment, coherency mode 210 may be implemented as single bit, such that a value of 1 means directory and a value of 0 means snoop (or vice versa). When coherency mode 210 is set to directory, the computing system via the caching agents manages a cache coherency protocol according to a directory-based scheme. When coherency mode 210 is set to snoop, the computing system via the caching agents manages a cache coherency protocol according to a snoop-based scheme.

Snooping is generally known as a scheme wherein a coherency controller (e.g., caching agent) associated with a memory monitors or snoops the transactions to the memory, and its goal is to maintain a cache coherency in distributed shared memory systems. When specific data in memory, say cache line X, is usable (e.g., readable/modifiable) by multiple processors, there is the possibility that multiple copies of the cache line X could be present in the caches of the processors (due to prior reads or writes of X from memory 142). Now when one of the processors, for example processor 1 102, wants to read X from memory 142, processor 1 must check if there is already a copy of X in any of the processor caches in the computing system, and also if any of these copies is a "newer copy" than the copy that is present in memory 142, For example, X could be equal to 100,000 in memory 142 but there could be an updated value of X=100,001 in the cache C3 of processor 3 106, due to processor 3 106 having read X earlier from memory 1 142 and modifying its value from 100,000 to 100,001 (in come computing architectures, such changes are not immediately propagated to memory 1 142). Without checking if the value of X is updated in one of the caches, a read issued by processor 1 102 of X to memory 142 (where X is situated) may violate a cache coherency. This checking can be done by snooping. In embodiments of the present invention, all of the caching agents monitor transaction accessing the memories. If a transaction modifying a shared cache block appears on the interconnect 110, a snoop is sent out to see if any of the processors have the same copy of the shared block in their caches. If any of the caches has the copy of the shared block, the corresponding snooper performs an action to ensure cache coherency. The action can be a transfer of the updated block to the requesting processor (processor 1 102 in the above example) It also involves a change of status in the directory bits in memory depending on the cache coherence protocol.

Figure 3:
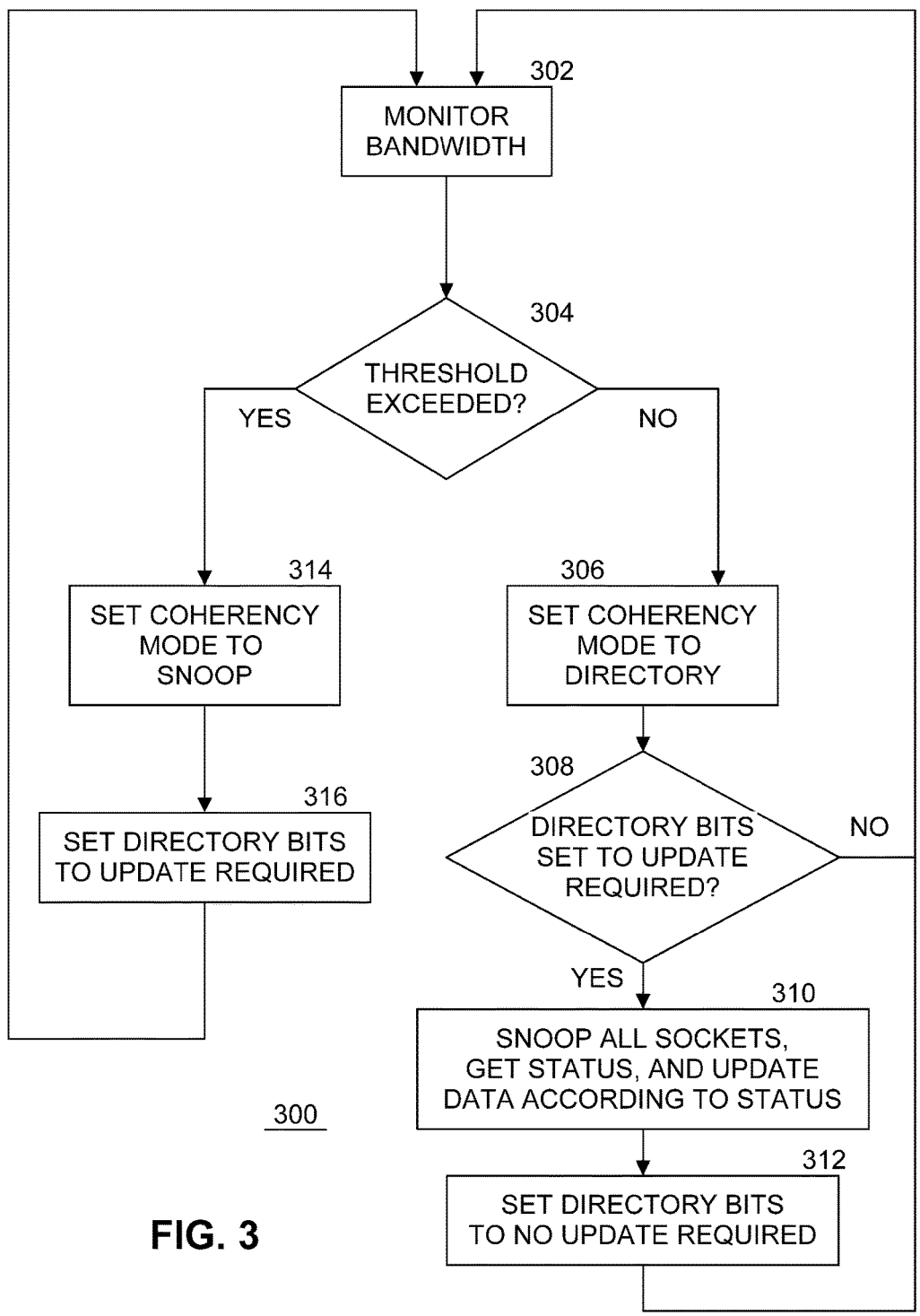
FIG. 3 illustrates an example first logic for adaptive coherence in a computing system.

FIG. 3 illustrates an example first logic for adaptive coherence in a computing system. In some examples, the process as shown in FIG. 3 depicts a process to manage a cache coherency protocol for processors and memories in a computing system. For these examples, this process may be implemented by or use components or elements of processors 102, 104, 106, and 108 shown in FIG. 1. However, this process is not limited to being implemented by or use only these components or elements of system 100.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Turning now to FIG. 3, processing begins at block 302, where in one embodiment a caching agent (such as one or more of caching agent 1 136, caching agent 2 138, caching agent 3 140, and caching agent N 142) monitors the bandwidth of the memory the caching agent is coupled to (such as memory 1 142, memory 2 144, memory 3 146, and memory N 148, respectively). In another embodiment, the memory controller 120 may monitor the bandwidth instead of the caching agent. The caching agent has a processor-centric view of bandwidth (e.g., how backed up are requests from this processor) and the memory controller has a memory-centric view (how backed up are requests to this specific memory). Bandwidth may be the number of bytes being read from or written to the memory per unit time. In an embodiment, the bandwidth may be obtained by reading one or more performance counters and/or registers included in a processor and calculating a write bandwidth metric. In other embodiments, other metrics relating to memory performance may be used. Monitoring of the bandwidth may be performed periodically. In an embodiment, writes and reads share the same channel. So even if the read bandwidth is high, it is indicative that one should not do the directory updates as this will decrease system efficiency. A bandwidth threshold may be predetermined and stored in the processor. In one embodiment the bandwidth threshold may be changed or selected programmatically from a set of predetermined levels, so as to provide the capability to "tune" the cache coherency protocol for selected application workloads of the computing system.

In one embodiment, a simple threshold may be used as a mechanism to implement a decision engine for setting the coherency mode, but in other embodiments more sophisticated mechanisms may be used, including analyzing additional telemetry data, taking into account user-based priorities, using address-range based decision making, and so on. In another embodiment, an interface allowing a user to specify the bandwidth thresholds, or bandwidth hints may be provided. In another embodiment, the threshold may vary depending on the memory technology used—for example, technology X may have a maximum bandwidth capability of A, but memory technology Y may have a maximum bandwidth capability of 2*A. The threshold for this embodiment may need to become double, for example.

At block 304, if the bandwidth has exceeded a threshold, then caching agent 136 sets the coherency mode 210 to indicate snoop at block 314. If the bandwidth threshold has not been exceeded, then caching agent 136 does not modify the cache coherency protocol; the cache coherency protocol remains at directory, shown as setting the coherency mode 210 to directory at block 306. In an embodiment, the coherency mode may be communicated to all processors. In one example, the coherency mode may be set for all memory in the platform. In another example, the coherency mode may be set on a per-memory region basis. However, since any processor can operate on any memory, all of the processors always need to be notified of any change in coherency mode by executing a snoop-like command to other caching agents.

If the coherency mode is now snoop, at block 316 the caching agent sets a special additional directory bit on each of cache lines 202, 204, . . . 206 (note that this special additional directory bit in each cache line in the processor cache has not been written to since the last change of coherency mode to indicate that the directory bits are no longer going to be valid and usable as the computing system is now going to use snoops and is not going to keep the directory bits up to date henceforth. The special additional directory bits may be known as directory state. Snoop coherency mode processing continues with more monitoring of the write bandwidth at block 302.

If the coherency mode is now directory, at block 308 caching agent 136 determines if the special additional directory bits are set to indicate that the directory for those lines is not up to date. If none of the special directory bits are set in any of the processor caches, no update is needed and processing continues with further directory coherency mode writes and monitoring of the write bandwidth at block 302. If special directory bits are set, then for each line that is present in the processor cache with the bits set, at block 310 caching agent 136 snoops all other sockets (e.g., S2 114, S3 116, and SN 118) of the computing systems, gets the status of each of the cache lines associated with the memory (e.g., memory 2 144, memory 3 146, and memory N 148, respectively) coupled to each socket, and updates the data in main memory and in the processor caches where lines are present, for those cache lines according to the status. Updating the data in each memory includes copying the latest version of data over to wherever needed. Alternately, those lines could be dropped from all caches and only the copy in main memory needs to be kept up to date. At block 312, caching agent 136 sets the special additional directory bits 202, 204, . . . 206 of the cache lines to indicate that no update is required. Processing continues with further directory coherency mode writes and monitoring of the write bandwidth at block 302.

Figure 4:
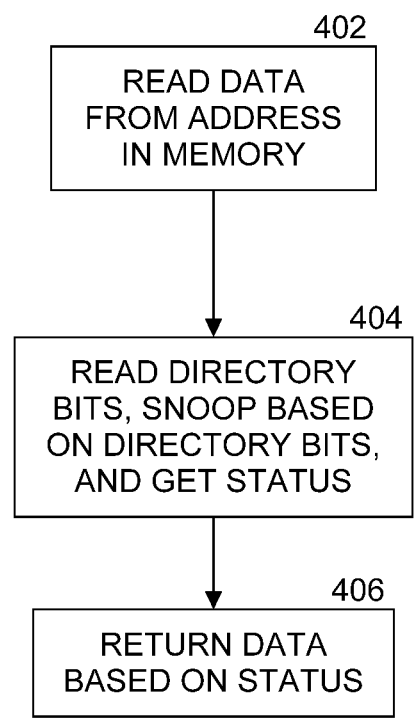
FIG. 4 illustrates an example second logic for a read when the coherence mode is directory.

FIG. 4 illustrates an example second logic for a read when coherence mode 210 is directory. When a processor, such as processor 1 102, for example, needs to read data from a memory, such as memory 1 142, for example, caching agent 1 136 reads the data from an address in memory at block 402. Processor 1 does not know if a local copy of the data at the address is being used by another processor, has been changed, and has not yet been written back to the memory (that is, is the data not coherent). Thus, at block 404 caching agent reads the directory bits of the cache lines for the address, snoops the other processors based the directory bits, and gets the status of the cache lines according to the snoops. In embodiments of the invention, caching agent 136 only snoops the processors that have accessed the address, as indicated by the directory bits. Accordingly, the caching agent may snoop less than the maximum number of processors in the computing system (as determined by the directory bits), thereby saving processing time for the computing system. At block 406, caching agent 1 136 returns the data from memory 1 142 if the status indicates that no other processors have changed copies of the data. If a snooped processor has changed the data according to the status, then caching agent 1 136 obtains the changed data from the snooped processor, writes the changed data back to memory 1 142, and returns the data to processor 1 102.

Figure 5:
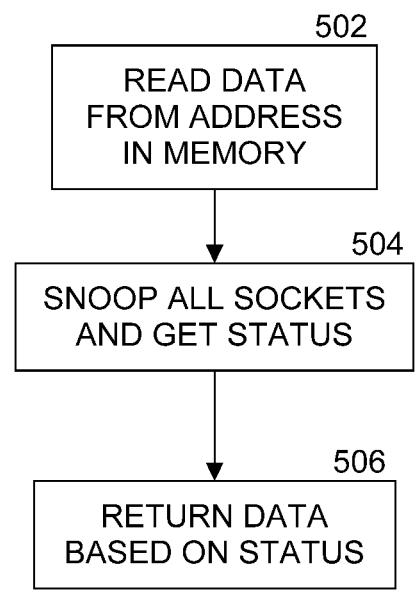
FIG. 5 illustrates an example third logic for a read when the coherence mode is snoop.

FIG. 5 illustrates an example third logic for a read when coherence mode 210 is snoop. When a processor, such as processor 1 102, for example, needs to read data from a memory, such as memory 1 142, for example, caching agent 1 136 reads the data from an address in memory at block 502. Processor 1 does not know if a local copy of the data at the address is being used by another processor, has been changed, and has not yet been written back to the memory (that is, is the data not coherent). Since the coherency mode is snoop, at block 504 caching agent snoops all other sockets (e.g., processors), and gets the status of the cache lines according to the snoops. At block 506, caching agent 1 136 returns the data from memory 1 142 if the status indicates that no other processors have changed copies of the data. If a snooped processor has changed the data according to the status, then caching agent 1 136 obtains the changed data from the snooped processor, writes the changed data back to memory 1 142, and returns the data to processor 1 102.

As disclosed above, embodiments of the present invention improve the processing capacity of the computing system by avoiding snooping of processors when directory bits indicate that the data at a requested address has not been changed by the processors. Further, the coherency mode of the computing system may be toggled as needed between a directory-base cache coherence protocol and a snoop-based cache coherence protocol based at least in part on a monitored write bandwidth of one or more memories in the system.

Figure 6:
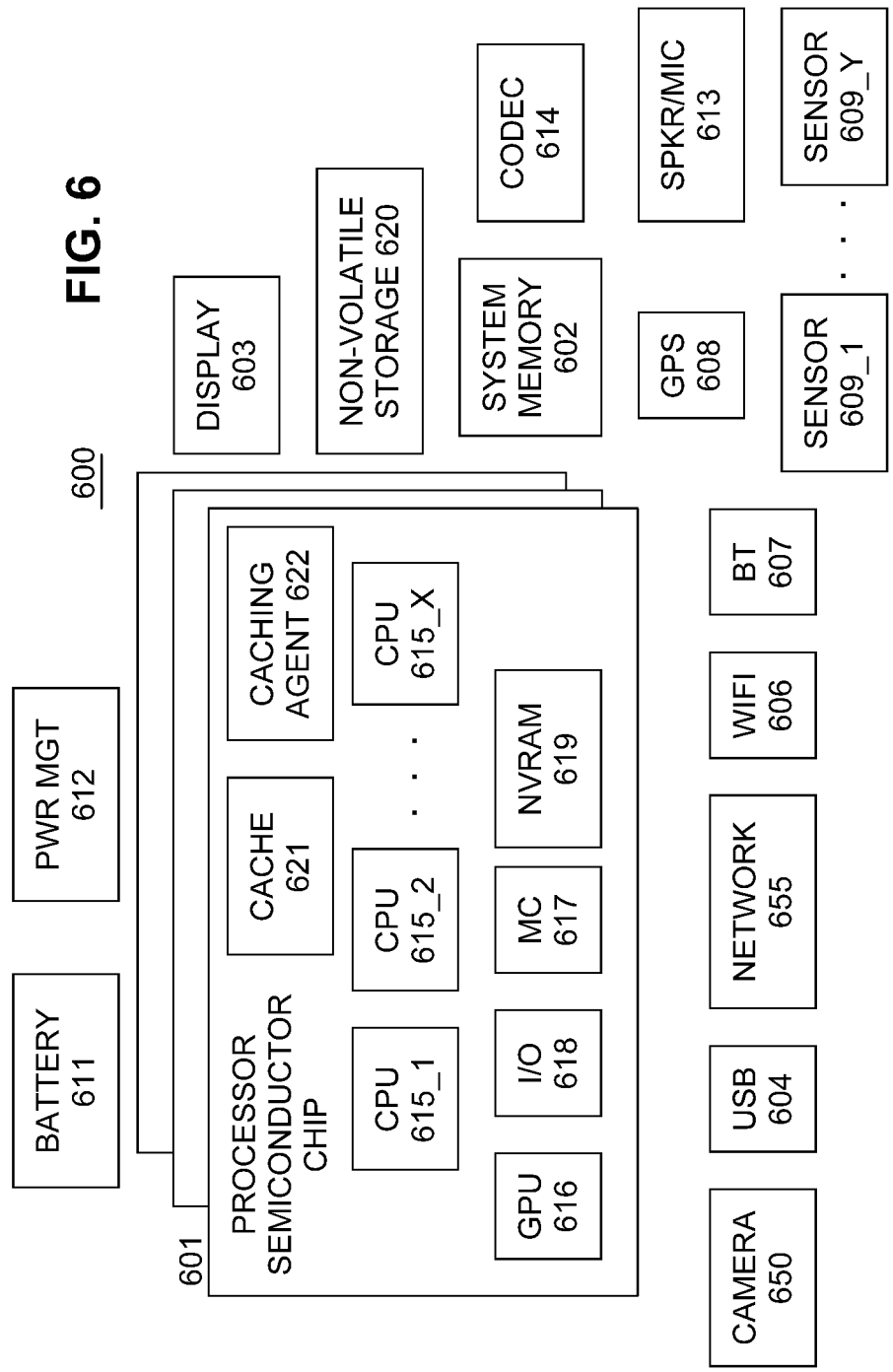
FIG. 6 illustrates an example third computing system.

FIG. 6 illustrates an example computing system that can perform adaptive coherence as discussed above. According to some examples, computing system 600 may include, but is not limited to, a server, a server array or server farm, a web server, a network server, an Internet server, a work station, a mini-computer, a main frame computer, a supercomputer, a network appliance, a web appliance, a distributed computing system, a personal computer, a tablet computer, a smart phone, multiprocessor systems, processor-based systems, or combination thereof.

As observed in FIG. 6, the computing system 600 may include at least one processor semiconductor chip 601 coupled to each other by sockets (not shown) and an interconnect (not shown) (which may include, e.g., a plurality of general purpose processing cores 615_1 through 615_X) and at least one main memory controller (MC) 617 disposed on a multi-core processor or applications processor, at least one system memory 602, a display 603 (e.g., touchscreen, flat-panel), a local wired point-to-point link (e.g., USB) interface 604, various network I/O functions 655 (such as an Ethernet interface and/or cellular modem subsystem), a wireless local area network (e.g., WiFi) interface 606, a wireless point-to-point link (e.g., Bluetooth (BT)) interface 607 and a Global Positioning System (GPS) interface 608, various sensors 609_1 through 609_Y, one or more cameras 650, a battery 611, a power management control unit (PWR MGT) 612, a speaker and microphone (SPKR/ MIC) 613 and an audio coder/decoder (codec) 614. The power management control unit 612 generally controls the power consumption of the system 600.

An applications processor or multi-core processor 601 may include one or more general purpose processing cores 615 within processor semiconductor chip 601, one or more graphical processing units (GPUs) 616, a memory management function 617 (e.g., a memory controller (MC)) and an I/O control function 618. The general-purpose processing cores 615 execute the operating system and application software of the computing system. The graphics processing unit 616 executes graphics intensive functions to, e.g., generate graphics information that is presented on the display 603. The memory control function 617 interfaces with the system memory 602 to write/read data to/from system memory 602. The processor 601 may also include embedded NVRAM 619, at least one cache memory 621, and a caching agent 622 as described above with reference to FIGS. 1-5.

Each of the touchscreen display 603, the communication interfaces 604, 655, 606, 607, the GPS interface 608, the sensors 609, the camera(s) 610, and the speaker/microphone codec 613, and codec 614 all can be viewed as various forms of I/O (input and/or output) relative to the overall computing system including, where appropriate, an integrated peripheral device as well (e.g., the one or more cameras 610). Depending on implementation, various ones of these I/O components may be integrated on the applications processor/multi-core processor 601 or may be located off the die or outside the package of the applications processor/multi-core processor 601. The computing system also includes non-volatile storage 620 which may be the mass storage component of the system.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A processor comprising:
a coherency mode indicating one of a directory-based cache coherence protocol and a snoop-based cache coherency protocol;
a caching agent coupled to the coherency mode, the caching agent to:
monitor a bandwidth usage of reading from and/or writing data to a memory coupled to the processor,
set the coherency mode to the snoop-based cache coherency protocol when the bandwidth usage exceeds a threshold, set the coherency mode to the directory-based cache coherency protocol when the bandwidth usage does not exceed the threshold, execute a snoop-based cache coherency protocol when the coherency mode is set to snoop-based cache coherency protocol, and execute a directory-based cache coherency protocol when the coherency mode is set to directory-based cache coherency protocol.

2. The processor of claim 1, comprising, when the coherency mode is set to snoop-based cache coherency protocol, the caching agent to: set at least one bit of at least one cache line coupling the processor and the memory to indicate an update of directory state is required for the at least one cache line.

3. The processor of claim 1, comprising, when the coherency mode is set to directory-based cache coherency protocol, the caching agent to: determine if at least one bit of at least one cache line coupled the processor and the memory is set to indicate an update of memory is required for the at least one cache line.

4. The processor of claim 3, comprising, when the at least one bit of the at least one cache line is set to indicate update of memory is required, the caching agent to:
snoop all sockets of a computing system including the processors of the computing system; and
update memory indicated by the at least one bit of the at least one cache line.

5. The processor of claim 4, comprising the caching agent to set the at least one bit of the at least one cache line to indicate no update of memory is required.

6. The processor of claim 5, comprising the caching agent, when the coherency mode is set to directory-based cache coherency protocol to:
read data from an address in memory;
read the at least one bit of the at least one cache line;
snoop sockets of the computing system based on the at least one bit of the at least one cache line to get status of the data in memory coupled to the sockets; and
return the data based on the status.

7. The processor of claim 5, comprising the caching agent, when the coherency mode is set to snoop-based cache coherency protocol to:
read data from an address in memory;
snoop all sockets of the computing system to get status of the data in memory coupled to the sockets; and
return the data based on the status.

8. A computing system, comprising:
an interconnect;
at least one socket coupled to the interconnect;
at least one memory;
at least one processor, coupled to the at least one memory, and coupled to the at least one socket, the processor including a coherency mode indicating one of a directory-based cache coherence protocol and a snoop-based cache coherency protocol;
a caching agent coupled to the coherency mode, the caching agent to:
monitor a bandwidth usage of reading from and/or writing data to the memory,
set the coherency mode to the snoop-based cache coherency protocol when the write bandwidth usage exceeds a threshold,
set the coherency mode to the directory-based cache coherency protocol when the write bandwidth usage does not exceed the threshold,
execute a snoop-based cache coherency protocol when the coherency mode is set to snoop-based cache coherency protocol, and
execute a directory-based cache coherency protocol when the coherency mode is set to directory-based cache coherency protocol.

9. The computing system of claim 8, comprising, when the coherency mode is set to snoop-based cache coherency protocol, the caching agent to: set at least one bit of at least one cache line coupling the processor and the memory to indicate an update of directory state is required for the at least one cache line.

10. The computing system of claim 9, comprising, when the coherency mode is set to directory-based cache coherency protocol, the caching agent to: determine if at least one bit of at least one cache line coupled the processor and the memory is set to indicate an update of memory is required for the at least one cache line.

11. The computing system of claim 10, comprising, when the at least one bit of the at least one cache line is set to indicate update of memory is required, the caching agent to:
snoop all sockets of the computing system; and
update memory indicated by the at least one bit of the at least one cache line.

12. The computing system of claim 11, comprising the caching agent to set the at least one bit of the at least one cache line to indicate no update of memory is required.

13. The computing system of claim 12, comprising the caching agent, when the coherency mode is set to directory-based cache coherency protocol to:
read data from an address in memory;
read the at least one bit of the at least one cache line;
snoop sockets of the computing system based on the at least one bit of the at least one cache line to get status of the data in memory coupled to the sockets; and
return the data based on the status.

14. The computing system of claim 12, comprising the caching agent, when the coherency mode is set to snoop-based cache coherency protocol to:
read data from an address in memory;
snoop all sockets of the computing system to get status of the data in memory coupled to the sockets; and
return the data based on the status.

15. A method comprising:
monitoring a bandwidth usage of reading from and/or writing data to a memory coupled to a processor;
setting a coherency mode to a snoop-based cache coherency protocol when the bandwidth usage exceeds a threshold;
setting the coherency mode to a directory-based cache coherency protocol when the bandwidth usage does not exceed the threshold;
executing a snoop-based cache coherency protocol when the coherency mode is set to snoop-based cache coherency protocol; and
executing a directory-based cache coherency protocol when the coherency mode is set to directory-based cache coherency protocol.

16. The method of claim 15, comprising, when the coherency mode is set to snoop-based cache coherency protocol:
setting at least one bit of at least one cache line coupling the processor and the memory to indicate an update of directory state is required for the at least one cache line.

17. The method of claim 15, comprising, when the coherency mode is set to directory-based cache coherency protocol:

determining if at least one bit of at least one cache line coupled the processor and the memory is set to indicate an update of memory is required for the at least one cache line.

18. The method of claim 17, comprising, when the at least one bit of the at least one cache line is set to indicate update of memory is required:
   snooping all sockets of a computing system, including the processors of the computing system; and
   updating memory indicated by the at least one bit of the at least one cache line.

19. The method of claim 18, comprising setting the at least one bit of the at least one cache line to indicate no update of memory is required.

20. The method of claim 19, comprising, when the coherency mode is set to directory-based cache coherency protocol:
   reading data from an address in memory,
   reading the at least one bit of the at least one cache line,
   snooping sockets of the computing system based on the at least one bit of the at least one cache line to get status of the data in memory coupled to the sockets, and
   returning the data based on the status.

21. The method of claim 19, comprising, when the coherency mode is set to snoop-based cache coherency protocol:
   reading data from an address in memory;
   snooping all sockets of the computing system to get status of the data in memory coupled to the sockets; and
   returning the data based on the status.

* * * * *